United States Patent
Forghieri (12)

(10) Patent No.: US 6,541,926 B1
(45) Date of Patent: Apr. 1, 2003

(54) ELECTRONICALLY CONTROLLED, POWER SAVING, POWER SUPPLY SYSTEM FOR FLUORESCENT TUBES

(76) Inventor: Antonio Forghieri, Largo Olgiata, 15, Rome RM (IT), 00123

( * ) Notice: Subject to any disclaimer, the term of this patent is extended or adjusted under 35 U.S.C. 154(b) by 0 days.

(21) Appl. No.: 09/889,286

(22) PCT Filed: Jan. 28, 2000

(86) PCT No.: PCT/IT00/00029

§ 371 (c)(1),
(2), (4) Date: Jul. 16, 2001

(87) PCT Pub. No.: WO00/47021

PCT Pub. Date: Aug. 10, 2000

(30) Foreign Application Priority Data

Feb. 3, 1999 (IT) ........................ RM99A0079

(51) Int. Cl.[7] ................................ G05F 1/00
(52) U.S. Cl. .................. 315/307; 315/224; 315/244; 315/291; 315/209 R; 315/DIG. 7
(58) Field of Search .............. 315/209 R, 244, 315/224, 219, 291, 307, 309, 312, 325, 360, DIG. 4, DIG. 7, 119, 126

(56) References Cited

U.S. PATENT DOCUMENTS

| 4,381,476 A | * | 4/1983 | Adachi et al. ............... 315/101 |
| 4,392,087 A | | 7/1983 | Zoltan ......................... 315/219 |
| 5,049,790 A | * | 9/1991 | Herfurth et al. ............. 315/224 |
| 5,386,181 A | * | 1/1995 | Orenstein .................... 315/219 |
| 5,500,792 A | | 3/1996 | Bok-Ki et al. ............ 315/307 X |
| 5,550,437 A | * | 8/1996 | Hopkins et al. ........... 315/209 R |
| 5,574,335 A | * | 11/1996 | Sun .............................. 315/119 |
| 5,739,645 A | * | 4/1998 | Xia et al. ................. 315/209 R |
| 5,828,188 A | | 10/1998 | Reinhard ...................... 315/309 |
| 5,925,990 A | * | 7/1999 | Crouse et al. ................ 315/307 |
| 5,932,974 A | * | 8/1999 | Wood .......................... 315/106 |

FOREIGN PATENT DOCUMENTS

| DE | 34 32 266 | 3/1985 |
| EP | 0 359 860 | 3/1990 |
| GB | 2 164 810 | 3/1986 |
| WO | WO97/13391 | 4/1997 |
| WO | WO97/43878 | 11/1997 |

OTHER PUBLICATIONS

IR: "IR2153/IR2153D, Preliminary Data Sheet No. PD 60062J", INTERNATIONAL RECTIFIER, 01031999.

* cited by examiner

*Primary Examiner*—Haissa Philogene
(74) *Attorney, Agent, or Firm*—Nixon & Vanderhye P.C.

(57) ABSTRACT

An energy saving electronic control circuit for fluorescent tubes, where it controls the tubes' light output. This system uses a half-bridge topology, which is supplied from an AC to DC current source obtained from the mains supply. The switching transistors are driven at rather high frequencies. An inductor is connected in series with a capacitor, forming an LC circuit, which is connected to the junction between the switching transistors and these resonant at the same switching frequency of the transistors. At least one tube is connected across one capacitor, in other words in series with the inductor at one end and at the center junction of a passive half-bridge formed by two capacitors in series.

10 Claims, 3 Drawing Sheets

ELECTRONICALLY CONTROLLED, POWER SAVING, POWER SUPPLY SYSTEM FOR FLUORESCENT TUBES

BACKGROUND AND SUMMARY OF THE INVENTION

The present invention relates to an electronically controlled power saving, power supply system for fluorescent tubes.

More particularly, the present invention relates to a system which drives fluorescent tubes with a much higher efficiency than a traditional setup would, the comprehensive protective features of the circuit enabling the designer to design ballasts with protection against over voltages, removed tubes and over-currents. It is also possible to enhance the circuit by employing a thermal cutout as well.

The following disclosure describes an electronic driver for fluorescent tubes, better known as an "Electronic Ballast".

It is known that hot cathode fluorescent tubes require an inductor, better known as choke, to limit the current and voltage to the tube from the incoming mains voltage. This setup also requires a switching element, better known as starter, to give the initial strike till the cathodes become warm. These starters have a relatively short life and give the annoying prolonged flashing during the starting phase.

The traditional setup arrangement produces another problem, which is somewhat more annoying or rather dangerous. When the tube is supplied from a 50 Hz source, this produces a 100 Hz flicker which is hardly noticed but in the presence of rotating machinery, becomes very hazardous since the machinery might seem to be stationary while rotating. This effect is better known as the "Stroboscopic Effect". Much has been done to try to solve the various problems, but others always arise.

The electronic driver system (electronic ballast) according to the present invention tends to solve practically all the problems of the prior art.

The characteristics of the device according to the invention will be stated in the characterizing part of the attached claims.

BRIEF DESCRIPTION OF THE DRAWINGS

The present invention will now be described with reference to currently preferred embodiments, illustrating and not limiting the invention and according to the figures of the attached drawings, in which.

DETAILED DESCRIPTION OF THE PREFERRED EMBODIMENTS

Figure 1:
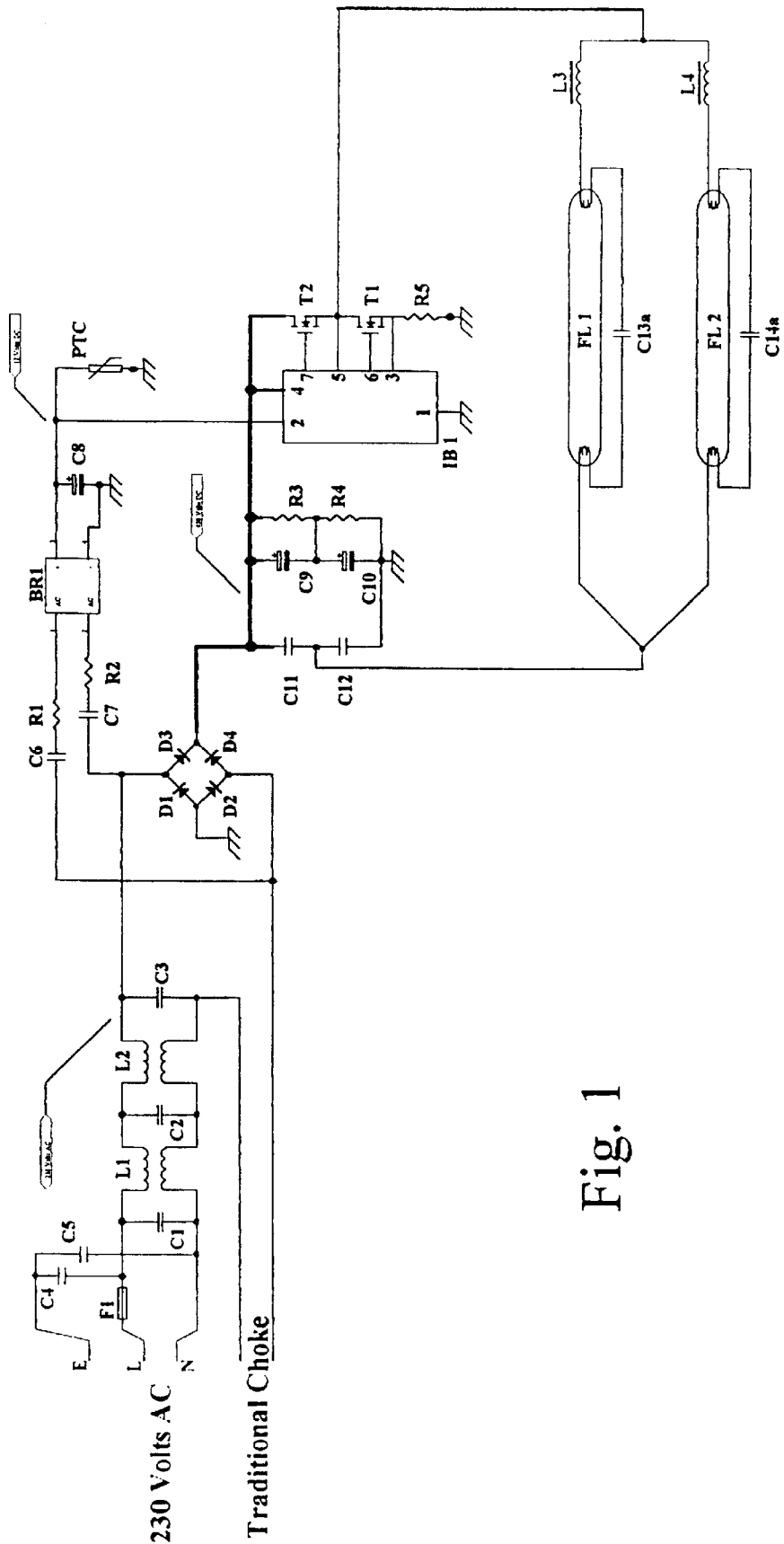
FIG. 1 shows the schematic diagram of a first embodiment of the electronic ballast according to the invention.
Figure 2:
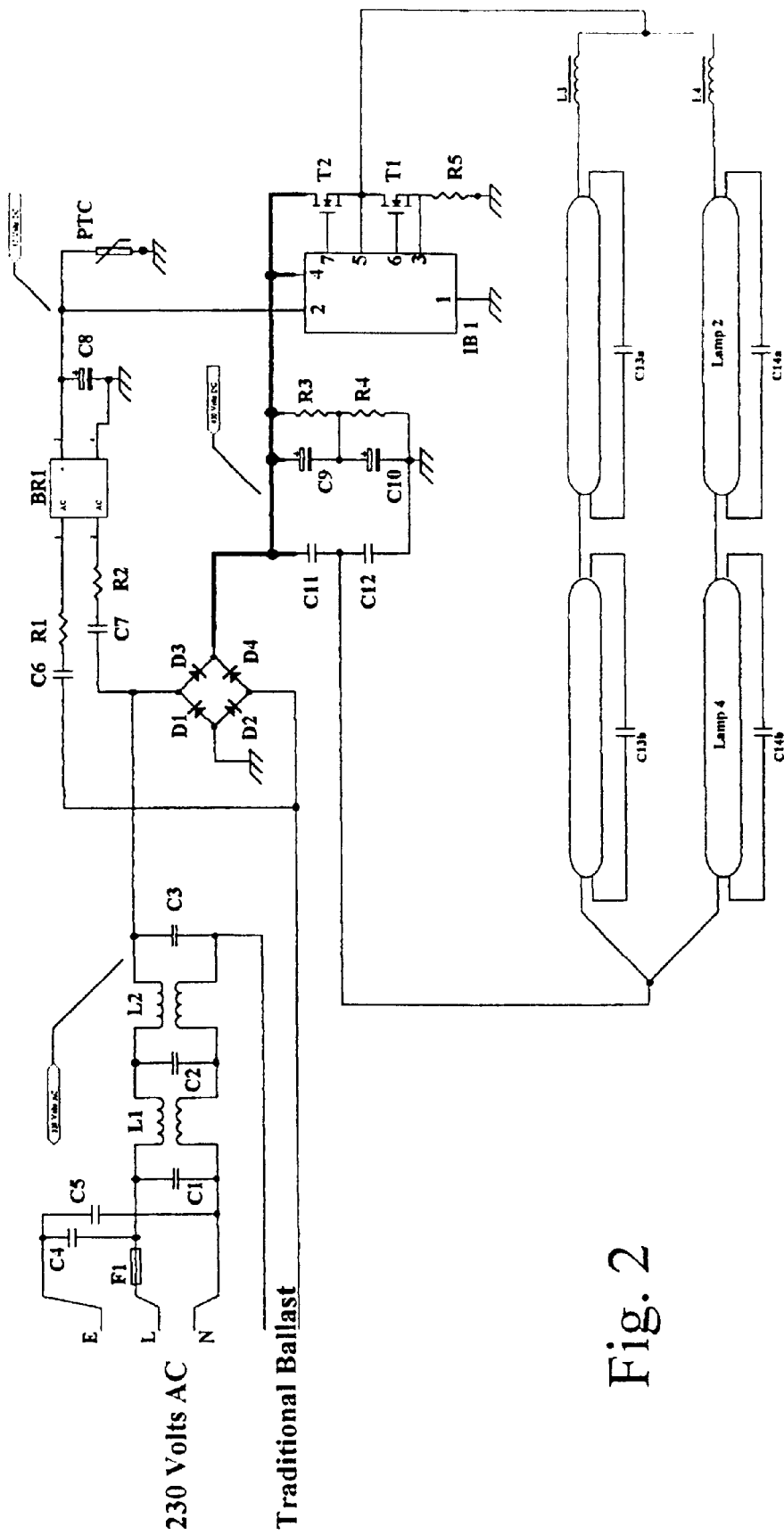
FIG. 2 shows a second embodiment of the schematic diagram of FIG. 1 above.

With reference to FIGS. 1 and 2, the proposed circuit shall be used in conjunction with a half bridge topology comprising MOSFETs or IGBTs as switching elements. The following circuit forms part of an overall strategy towards designing more environmentally friendly fluorescent tube ballasts. The main benefit of the system according to the invention is energy saving which is hard to beat with conventional electronic ballasts. The comprehensive protective features of the circuit enable the designer to design ballasts with protection against over-voltages, over-current, over-temperature and removed tubes.

FIGS. 1 and 2 show typical layouts, which are practically identical, and therefore only FIG. 1 will be described.

The disclosure starts with the detailed description of the controller. A discussion of practical tips, which make the realization of a superior energy saving electronic ballast possible, follows.

Fuse F1 protects the incoming installation from any possible short circuit caused by the electronic ballast in the case of malfunction. C1, L1 and C2, L2 form a double filter that block any incoming or outgoing electrical noise in a wide band of frequencies. C3, connected with the traditional inductor already found in the light fixture, acts to correct the power factor and as an additional filter for the lower frequency range. C4 and C5 are class Y capacitors to filter out the very high frequencies generated by the ballast's oscillator and its switching devices.

C6, C7, C8, R1, R2 and BR1 form the ballast controller's power supply. It is basically a capacitive power supply, which dissipates only a fraction of the power dissipated if a dropper resistor where to be used. C8 smoothes the 100/120 Hz ripple.

An alternative power supply can be easily obtained by substituting C6, C7, C8, R1, R2 and BR1 by a dropper resistor and connected to D3 and D4 cathodes. This way the circuit can be supplied by AC and DC input supplies. DC input supplies are usually found in emergency circuits and in naval installations.

Diodes D1–D4 rectify the input supply for the power section of the electronic ballast. Resistors R3 and R4 assure that the DC bus supply is equally distributed across the reservoir capacitors C9 and C10. C11 and C12 further limit the current of the fluorescent tubes.

MOSFETs T1 and T2, which are controlled by the circuit IB1 and will be described later with reference to FIG. 3, supply two resonant circuits each made of a capacitor in series with an inductor (L3, C13A and L4, C14A). Each capacitor has one fluorescent tube in parallel, and the return of the resonant circuit is connected to C11 and C12 junction, which are connected in a half-bridge configuration. The preferred drive frequency used is around 40 kHz.

Resistor R5 monitors the current passing through the switching devices (T1, T2), and triggers the protection circuit in circuit IB1 in case of over current due to a fault or bad installation.

The gap of the ferrites, which constitutes the output chokes L3 and L4, plays a very important role in reducing the energy consumed. A gap size of 1.2 mm for the N27 core provides the best compromise between leakage flux and the heat build up in the ferrite itself The windings are based on single stranded wire, since the effect of the skin effect at around 40 kHz is not too pronounced with wires having a diameter of less than 0.6 mm. The standard choke design procedure may be followed bearing in mind that the size of the gap should be around 1.2 mm.

It is important to keep the capacitance value of the capacitor shunting the fluorescent tubes FL1 and FL2 to a minimum; thus ensuring that most of the current flowing through the choke is that required by the tubes themselves. One must, however, bear in mind that the LC combination of the output inductor (or choke) puts limit on the capacitance value of the capacitor, since the smaller it is, the larger the inductance of the choke has to be. A too large value of inductance (L3, L4) may necessitate the use of a larger ferrite, which may not be possible due to physical and financial constraints and reduced light output.

Capacitors C13A and C14A can be fitted in starter cases, which will eventually substitute the traditional mechanical starters, thus reducing installation wiring modifications.

The use of MOSFET transistors reduces drastically most losses, in practice the overheating of the transistors does not exceed 43° C. in a 25° C. ambient temperature and with an input supply of 300 Volts AC and having a load of 116 W (2×58 W), thus reducing size and cost.

The circuit can also easily handle a wide range of input supply from 140 V to 380 V. At the high end of the range the over voltage protection is triggered. When this protection triggers, the ballast can be reused once it is reset.

The hybrid circuit IB1 together with some auxiliary circuits will be described with reference to FIG. 3.

IC1, preferably IR 2153 of International Rectifier, is a self-oscillating half bridge driver for the MOSFET transistors T1 and T2. The frequency of operation is programmed by the combination of R7 and C4 and is approximately given by $$f=1/(1.4 \times R1 \times C1) \text{ Hz}$$

An external DC source of 12 V @ 10 mA meets the power requirements of the circuit. Zener diode ZD1 ensures that the voltage is clamped at 12 V. Resistors R8 and R9 in conjunction with the parallel high-speed diodes limit the rate at which the switching element, either a MOSFET or IGBT, switches on. This has the benefit of reducing electromagnetic emissions by reducing the rate of change of the Drain Voltage. The high-speed diodes ensure that switch off takes place at a faster rate than switch on. This further increases the inherent dead time of IC1. Diode D2 and capacitor C5 form the bootstrapping circuit, which provides the upper, floating switching element with enough voltage to switch on.

The protection circuit may be divided in two parts
the over-voltage
the over-current sections.

Over voltage protection is achieved by continuously sampling the bus voltage by means of resistors R1, R2, R3 and R4. Capacitor C2 smoothes any ripple which might be present. If the sampled voltage, which is that voltage across R4, exceeds the break-over voltage of the DIAC SCR2, and the trigger voltage of SCR1, the latter latches on and the voltage at pin 1 of IC1 is reduced to practically ground potential. Once power is removed from the IC1, the circuit and hence the ballast switches off. Operation is automatically resumed once the power to the ballast is switched off and on again.

Over current protection is achieved by D1, R5, C3, R6 and SCR1. A current to voltage converter feeds D1 with a voltage equivalent to the instantaneous load current of the ballast. This voltage is rectified by diode D1. R5 and R6 form a potential divider, which samples the voltage across the current sensor. Capacitor C3 serves as a spike filter as well as delays the sampled voltage before it reaches the gate of SCR1. This ensures that the circuit does not trip on start up. Once the sampled voltage exceeds the trigger voltage of SCR1, which is about 0.7 volts, the thyristor latches on and the ballast stops functioning. The circuit is self-starting once power is switched off and on.

A thermal protection may be added by simply attaching a quick changeover thermal device, such as the TO-92 enclosed solid state fuses supplied by RS components, between the supply of the 12 V circuit and the ground. Needless to say, the power supply must be current limited.

Figure 3:
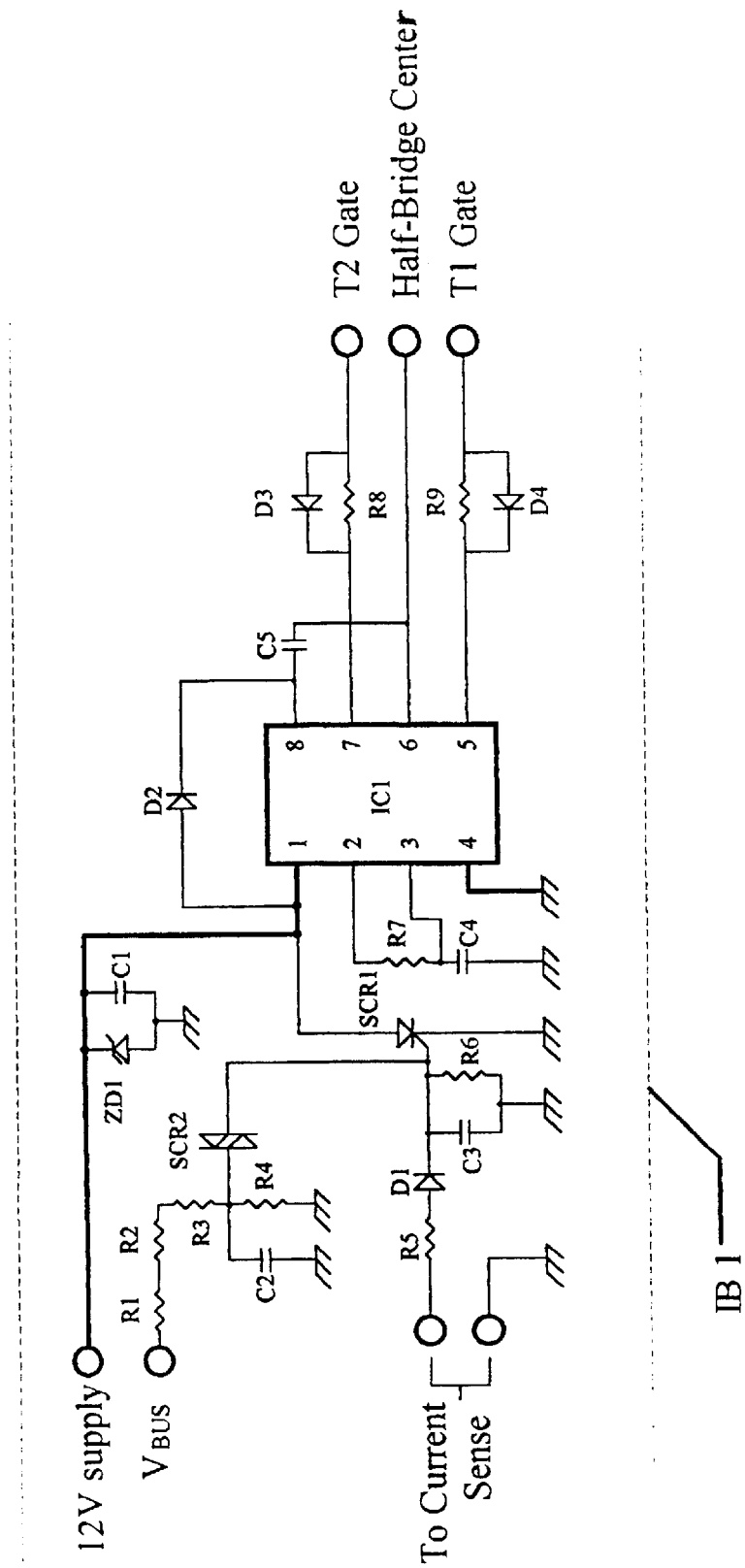
FIG. 3 shows the schematic diagram of a block diagram shown in FIGS. 1 and 2.

The following tables 1 and 2 show, by illustrative, but not limiting way, the parts list referring to FIGS. 1 and 3. Needless to say that the components of FIG. 2 are the same as FIG. 1 and do not need to be disclosed into detail.

TABLE 1

| Component | Description | Manufacturer number |
| --- | --- | --- |
| D1, D2, D3, D4 | High speed diodes <=115 nS-1.5 A-1000 V | BYM11-800 |
| R3, R4 | Resistor | 470k W |
| R1, R2 | Resistor | 120 W |
| R5 | Resistor | 0.33 W |
| BR1 | Bridge rectifier | MB8S |
| C8 | Electrolytic capacitor | 100 mF–25 V |
| C9, C10 | Electrolytic capacitor | 22 mF–250 V |
| C1 | Polypropylene Capacitor Class X2 | 470 nF–275 V |
| C2, C3 | Polypropylene Capacitor Class X2 | 68–100 nF–630 V |
| C6, C7 | Metalized polypropylene Capacitor | 470 nF–250 V |
| C11, C12 | Metalized polypropylene Capacitor | 100–220 nF–630 V |
| C4, C5 | Class Y Capacitor/High Voltage | 1 nF–275 V/1 nF–1 kV |
| T1, T2 | MOSFET transistors | IRF840 |
| L1, L2 | Common mode chokes | 45 mH |
| L3, L4 | Output chokes | |
| C13a, C14a | Metalized polypropylene Capacitor | 10 nF–630 V |

C13a, C14a: 10 nF = 36 Watt; 12 nF = 58 Watt; 15 nF = 2 × 18 Watt

TABLE 2

| Component | Description | Manufacturer number |
| --- | --- | --- |
| D2, D3, D4 | High speed diodes <=115 nS-1.5 A-1000 V | BYM 37 M |
| D1 | Diode 1N4007 type or the like | BYM 10–1000 |
| ZD1 | Zener diode 12 Volts | BZD 27 C 12 |
| SCR2 | Diac | BR 100/03 LLD |
| SCR1 | Thyristor | BT 148 W–400 R |
| IC1 | IC-product of International Rectifier | IR 2153 |
| R8, R9 | Resistor | 47 W |
| R7 | Resistor | 18 kW |
| R4, R6 | Resistor | 27 kW |
| R5 | Resistor | 56 kW |
| R1, R2 | Resistor | 120 kW |
| R3 | Resistor | 150 kW |
| C4 | Capacitor | 1 nF |
| C1, C2, C3, C5 | Capacitor | 100 nF |

The above description refers to an electronic ballast for hot cathode fluorescent tubes, having an efficiency in the region of 40% without any penalty on the light flux. This electronic ballast has a superior efficiency than other electronic ballasts found in the market.

This documentation has been described referring to the diagrams and parts list above, however it is not limited to such, as in practice some components can be substituted providing the same or maybe even a slightly better result. A person skilled in the art can easily carry out these modifications.

What is claimed is:

1. An electronically controlled, power saving, power supply system for fluorescent tubes, comprising: a half-bridge transistor driving unit for driving half-bridge transistors co-operating with a DC power supply operating at line voltage, wherein said half-bridge transistors are driven at a relatively high frequency; an intermediate point of said half-bridge transistors being connected to a resonating unit which includes at least one inductor and one capacitor resonating at substantially a drive frequency of said driving unit, wherein at least one fluorescent tube is connected in parallel with at least one capacitor; another end of said resonating unit being connected to a center point of a passive half-bridge including two series-connected capacitors; and further wherein said half-bridge transistors comprise MOSFET transistors and said driving unit for the half-bridge transistors is fed separately at a low voltage with a rectifier bridge supplied by mains through a pair of series-connected RC groups.

2. A power supply system for fluorescent tubes as defined in claim 1, further including at least two pairs of conductors and capacitors for simultaneously supplying power to a plurality of fluorescent lamps.

3. A power supply for fluorescent tubes as defined in claim 2, further including two series-connected capacitors for each inductor with a respective fluorescent tube connected in parallel with each capacitor.

4. A power supply for fluorescent tubes as defined in claim 2, wherein the driving unit drives gates of said MOSFET transistors respectively through a unit having a diode in parallel with a resistor.

5. A power supply for fluorescent tubes as defined in claim 1, wherein an output of the rectifier bridge is connected with a PTC component arranged to shut off the drive unit upon an excessive temperature increase.

6. A power supply for fluorescent tubes as defined in claim 1, wherein the drive unit includes an arrangement having an SRC driven through a DIAC for turning off the drive unit in the event of an over-voltage condition.

7. An electronically controlled, power saving, power supply system for fluorescent tubes, comprising: a half-bridge transistor driving unit for driving half-bridge transistors co-operating with a DC power supply operating at line voltage, wherein said half-bridge transistors are driven at a relatively high frequency; an intermediate point of said half-bridge transistors being connected to a resonating unit which includes at least one inductor and one capacitor resonating at substantially a drive frequency of said driving unit, wherein at least one fluorescent tube is connected in parallel with at least one capacitor; another end of said resonating unit being connected to a center point of a passive half-bridge including two series-connected capacitors; and further wherein said half-bridge transistors comprise MOSFET transistors and said driving unit for the half-bridge transistors is fed separately at a low voltage using a resistive voltage divider from the DC power supply substantially at mains voltage for feeding said driving unit.

8. A power supply system for fluorescent tubes as defined in claim 7, further including at least two pairs of conductors and capacitors for simultaneously supplying power to a plurality of fluorescent lamps.

9. A power supply for fluorescent tubes as defined in claim 8, further including two series-connected capacitors for each inductor with a respective fluorescent tube connected in parallel with each capacitor.

10. A power supply for fluorescent tubes as defined in claim 8, wherein the driving unit drives gates of said MOSFET transistors respectively through a unit having a diode in parallel with a resistor.

* * * * *